US007715628B2

(12) United States Patent
Jun et al.

(10) Patent No.: US 7,715,628 B2
(45) Date of Patent: May 11, 2010

(54) PRECISE GRAYSCALE CHARACTER SEGMENTATION APPARATUS AND METHOD

(75) Inventors: Sun Jun, Beijing (CN); Yoshinobu Hotta, Kawasaki (JP); Yutaka Katsuyama, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1090 days.

(21) Appl. No.: 11/356,449

(22) Filed: Feb. 17, 2006

(65) Prior Publication Data

US 2006/0245650 A1     Nov. 2, 2006

(30) Foreign Application Priority Data

Feb. 18, 2005   (CN) ...................... 2005 1 0008512

(51) Int. Cl.
*G06K 9/34* (2006.01)
(52) U.S. Cl. .................. 382/176; 382/177; 382/190; 382/254; 382/274
(58) Field of Classification Search ................ 382/176, 382/177, 190, 254, 274
See application file for complete search history.

(56) References Cited

U.S. PATENT DOCUMENTS

| 4,092,631 | A | * | 5/1978 | Suzuki et al. .............. 382/202 |
| 5,172,422 | A | | 12/1992 | Tan |
| 5,689,585 | A | * | 11/1997 | Bloomberg et al. ......... 382/229 |
| 5,692,069 | A | | 11/1997 | Hanson |
| 5,841,902 | A | * | 11/1998 | Tu .............................. 382/187 |
| 5,956,433 | A | * | 9/1999 | Sasaki ........................ 382/275 |
| 6,327,385 | B1 | | 12/2001 | Kamitani |
| 2003/0198386 | A1 | * | 10/2003 | Luo ........................... 382/199 |
| 2003/0212555 | A1 | * | 11/2003 | van Santen ................ 704/241 |

OTHER PUBLICATIONS

Y. Lu, "Machine Printed Character Segmentation—An Overview," Pattern Recognition, vol. 28, No. 1, 1995, pp. 67-80.
S. Lee et al., A New Methodology for Gray-Scale Character Segmentation and Recognition, vol. 28, No. 10, 1996, pp. 1045-1050.
R. Gonzalez et al., "Digital Image Processing, Second Edition," Publishing House of Electronics Industry, Mar. 2003, p. 50.
Y. Zhang, "Image Processing and Analysis," Tsinghua University Press, Mar. 1991, pp. 76-77, 436-437, 50-53 and 530-535.
Gonzalez, "Digital Image Processing, Second Edition," Publishing House of Electronic Industry, Mar. 2003, pp. 435-436.

* cited by examiner

*Primary Examiner*—Samir A. Ahmed
*Assistant Examiner*—Ali Bayat

(57) ABSTRACT

Precise grayscale character segmentation apparatus and method. The precise grayscale character segmentation apparatus comprises an adjustment and segmentation unit for adjusting and segmenting an inputted low resolution text line image undergone coarse segmentation, so as to generate an adjusted character image; a character image binarization unit for generating a binary character image from the character image inputted therein; a noise removal unit for removing noise information in the binary character image generated by the binarization unit; and a final character image segmentation unit for generating a precisely segmented character image from the binary character image from which noise has been removed.

20 Claims, 6 Drawing Sheets

PRECISE GRAYSCALE CHARACTER SEGMENTATION APPARATUS AND METHOD

CROSS-REFERENCE TO RELATED APPLICATIONS

The present invention relates to an apparatus and a method for precise segmentation of grayscale characters, and particularly to a method and apparatus for precise segmentation of single characters in a low resolution grayscale text line image which has undergone coarse segmentation.

BACKGROUND OF THE INVENTION

1. Field of the Invention

Character segmentation is one of the pre-processing steps of character recognition. Many papers and patents have been published for this technology, such as:

Y. Lu, "Machine printed Character Segmentation—An Overview", Pattern Recognition, Vol. 28, no. 1, pp. 67-80, Jan. 1995;

S. W. Lee, D. J. Lee, H. S. Park, "A New Methodology for Gray-Scale Character Segmentation and Recognition", IEEE transaction on pattern analysis and machine intelligence, Vol. 18, no. 10, pp. 1045-1050, Oct. 1996;

Kamitani "Character segmentation device and character segmentation system", U.S. Pat. No. 6,327,385;

Hanson, "Apparatus for performing character segmentation using slant histograms", U.S. Pat. No. 5,692,069; and Tan, "Fast character segmentation of skewed text lines for optical character recognition", U.S. Pat. No. 5,172,422, etc.

All of the aforementioned papers and patents are dealing with how to process touching characters, and many of these methods make use of binary character images, but the application of these methods in segmentation of low resolution images raises as many errors as they could solve. So far, not a single paper or patent has been proposed to deal with segmentation of low resolution grayscale characters.

Low resolution character recognition is a very difficult task. Using of grayscale feature is one possible solution to this problem. However, if the character is not segmented precisely from the background, the feature extracted from the image will not be very effective. So a precise segmentation of the low resolution character is a must to a successful grayscale feature extraction method.

For a low resolution character image, the size is usually less than 20*20 pixels and the real boundary of the character is usually located within one pixel. Consequently, a precise location of real character boundary is very important to the subsequent feature extraction module. It is obvious that there is a need for a method and an apparatus capable of precise segmentation of low resolution grayscale character images.

2. Description of the Related Art

The present invention is proposed in view of the above defects in the state of the art to provide an apparatus and a method for precise segmentation of grayscale characters.

According to one aspect of this invention, there is provided a precise grayscale character segmentation apparatus, which comprises an adjustment and segmentation unit, for adjusting and segmenting single-character images in a low resolution grayscale text line image undergone coarse segmentation which is inputted therein, so as to generate adjusted and segmented character images; a character image binarization unit, for generating a binary character image from the adjusted and segmented character image inputted; a noise removal unit, for removing noise information in the binary character image generated by the character image binarization unit; and a final character image segmentation unit, for generating a precisely segmented character image from the binary character image from which noise information has been removed.

The apparatus preferably further includes an amplification unit, which is interposed between the adjustment and segmentation unit and the character image binarization unit, for amplifying the adjusted and segmented character image generated by the adjustment and segmentation unit before the adjusted and segmented character image is inputted into the character image binarization unit.

The apparatus preferably further includes a character image enhancement unit, which is interposed between the adjustment and segmentation unit and the character image binarization unit, for enhancing the adjusted and segmented character image generated by the adjustment and segmentation unit before the adjusted and segmented character image is inputted into the character image binarization unit, to make clearer the strokes of the character within the character image.

The apparatus preferably further includes a character image enhancement unit, which is interposed between the amplification unit and the character image binarization unit, for enhancing the adjusted and segmented character image amplified by the amplification unit before the adjusted and segmented character image amplified is inputted into the character image binarization unit, to make clearer the strokes of the character within the character image.

Preferably, the adjustment and segmentation unit includes a text line direction detection unit, for detecting the direction of the text line which is in the text line image; a character image size calculation unit, for calculating the size of the character image; and a character image adjustment unit, for adjusting the character image in response to the detecting result of the text line direction detection unit and the calculating result of the character image size calculation unit, so that all strokes of the character are contained in the character image.

Preferably, the character image enhancement unit includes a background pixel value estimation unit, for estimating the background pixel value of an inputted character image; a background removal unit, for removing the background of the character image based on the estimating result estimated by the background pixel value estimation unit; and a pixel value enhancement unit, for enhancing pixel value of the character image from which the background has been removed.

Preferably, the background pixel value estimation unit estimates the background pixel value using a histogram based method.

Preferably, the pixel value enhancement unit enhances the pixel value of the character image whose background has been removed using an S shape function.

Preferably, the noise removal unit includes a connected component analysis unit, for analyzing connected components of the binary character image to find out all pixel points of each connected component and calculate the total number of the connected components within the binary character image; a noise connected component determination unit, for determining whether a connected component is a noise connected component; and a noise connected component removal unit, for removing the connected component within the binary character image which is determined as a noise connected component by the noise connected component determination unit.

Preferably, the noise connected component determination unit determines whether a connected component is a noise connected component by the following two condition: 1) size of the connected component<size of the binary character image/scale number; and 2) distance between the boundary of the connected component and the boundary of the binary character image<threshold; a connected component is determined as a noise connected component if it satisfies both of the conditions.

Preferably, the scale number is 3 or 4.

According to another aspect of this invention, there is provided a method for precisely segmenting single grayscale characters in a text line image undergone coarse segmentation, comprising: an adjustment and segmentation step, for adjusting and segmenting single-character images in an inputted low resolution grayscale text line image undergone coarse segmentation, so as to generate adjusted and segmented character images; a character image binarization step, for binarizing the character image processed by the adjustment and segmentation step; a noise removal step, for removing noise information in the binary character image generated at the character image binarization step; and a final character image segmentation step, for generating a precisely segmented character image from the binary character image from which noise information has been removed.

The method preferably further includes an amplification step, for amplifying the adjusted and segmented character image generated at the adjustment and segmentation step.

The method preferably further includes a character image enhancement step, for enhancing the adjusted and segmented character image amplified at the amplification step, to make clearer the strokes of the character within the character image.

The adjustment and segmentation step includes a text line direction detection step, for detecting the direction of the text line; a character image size calculation step, for calculating the size of the character image; and a character image adjustment step, for adjusting the character image in response to the detecting result of the text line direction detection step and the calculating result of the character image size calculation step, so that all strokes of the character are contained within the character image.

The character image enhancement step includes a background pixel value estimation step, for estimating the background pixel value of a character image; a background removal step, for removing the background of the character image based on the estimating result estimated by the background pixel value estimation step; and a pixel value enhancement step, for enhancing pixel value of the character image from which the background has been removed.

The background pixel value is estimated by using a histogram based method at the background pixel value estimation step.

The pixel value of the character image from which the background has been removed is enhanced using an S shape function at the pixel value enhancement step.

The noise removal step includes a connected component analysis step, for analyzing connected components of the binary character image to find out all pixel points of each connected component and calculate the total number of the connected components within the binary character image; a noise connected component determination step, for determining whether a connected component is a noise connected component; and a removal step, for removing the connected component within the binary character image which is determined as a noise connected component at the noise connected component determination step.

A connected component is determined whether to be a noise connected component or not at the noise connected component determination step by the following two conditions: 1) size of the connected component<size of the binary character image/scale number; and 2) distance between the boundary of the connected component and the boundary of the binary character image<threshold; a connected component is determined as a noise connected component if it satisfies both of the conditions.

This invention can precisely obtain the boundary of a character in a low resolution character image, and can thus perform effective segmentation of character images, thereby guaranteeing effective subsequent procedures (such as character feature extraction) in character recognition.

SUMMARY OF THE INVENTION

BRIEF DESCRIPTION OF THE DRAWINGS

FIG. 6-1 shows an inputted character image having undergone coarse segmentation.

FIG. 6-2 shows the result of the coarse segmentation and adjustment.

FIG. 6-3 shows the result of removal of the background pixels.

FIG. 6-4 shows the result of binarization.

FIG. 6-5 shows the result of removal of the noise.

FIG. 6-6 shows the result of the character image having been finally segmented.

DETAILED DESCRIPTION OF THE PREFERRED EMBODIMENTS

The principle and the preferred embodiments of this invention are explained in detail below in conjunction with the accompanying drawings.

This invention is directed to precise segmentation of each of the characters after the result of coarse segmentation of a low resolution text line image and each of the characters in this text line image has been known. A character thus segmented can be used for feature extraction in character recognition. Coarse segmentation can be either carried out by rough manual framing of the boundary of a character, or automatically obtained by means of the result of binarization of an image. The framed boundary may contain many background regions; furthermore, partial boundary of a character may also be singled out by segmentation. Precise segmentation means to precisely find out the upper, lower, left and right boundaries of a character.

Figure 1:
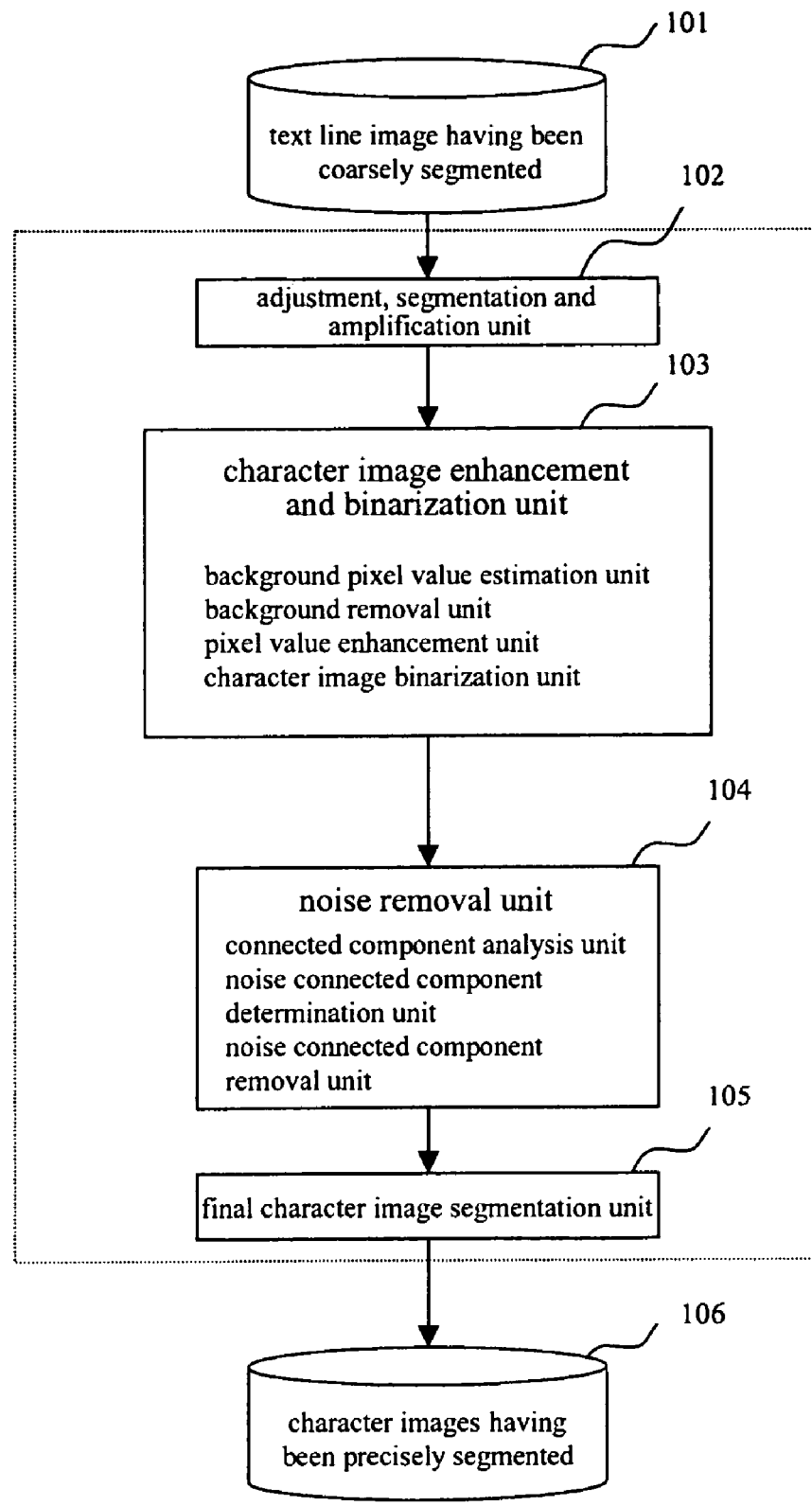
FIG. 1 is a schematic block diagram showing the precise grayscale character segmentation apparatus of this invention.

FIG. 1 is a schematic block diagram showing the precise grayscale character segmentation apparatus of this invention. As shown in FIG. 1, the precise grayscale character segmentation apparatus of this invention comprises an adjustment, segmentation and amplification unit 102, a character image enhancement and binarization unit 103, a noise removal unit 104 and a final character image segmentation unit 105. The input is a low resolution grayscale text line image 101 having been coarsely segmented, and the output is the character images 106 having been precisely segmented. It should be noted, however, that the aforementioned units are only exemplary in nature, and should not be considered to restrict this invention. The adjustment, segmentation and amplification unit 102 can be further divided into an adjustment and segmentation unit and an amplification unit, while the character image enhancement and binarization unit 103 can also be further divided into a character image enhancement unit and a character image binarization unit; moreover, the character image enhancement unit can be further subdivided into a background pixel value estimation unit, a background pixel value removal unit and a pixel value enhancement unit. Additionally, the adjustment, segmentation and amplification unit can consist of a text line direction detection unit, a character size calculation unit and a character image adjustment unit etc. The noise removal unit can be further divided into a connected component analysis unit, a noise connected component determination unit and a noise connected component removal unit.

As noted above, coarse segmentation of a character image can be either manually done, or obtained by prior art automatic segmentation of a binarized image. Subsequently the adjustment, segmentation and amplification unit 102 adjusts the result of the coarse segmentation of the inputted low resolution text line image, and the character image enhancement and binarization unit 103 enhances and binarizes the character image, which is then removed of noise by the noise removal unit 104 to generate a binarized character image free of noise. Finally the final character image segmentation unit 105 performs final segmentation of the character image, finds out the boundary of the character of the binarized character image generated in the noise removal unit 104, displays the real character boundary in an amplified grayscale image, and carries out extraction. The output result from the final character image segmentation unit 105 is the character images 106 having been precisely segmented.

In the following paragraphs FIGS. 2-5 are combined to explain in detail the operations of each of the aforementioned units 102-105.

In the adjustment, segmentation and amplification unit 102, the result of the coarse segmentation of the previous and next characters of each character in the inputted text line image (see FIG. 6-1) is firstly used to adjust the boundary limit of this character, the adjusted image content is then extracted (segmented) and amplified, so that images of the real character all fall within the outputted and amplified grayscale character image.

Figure 2:
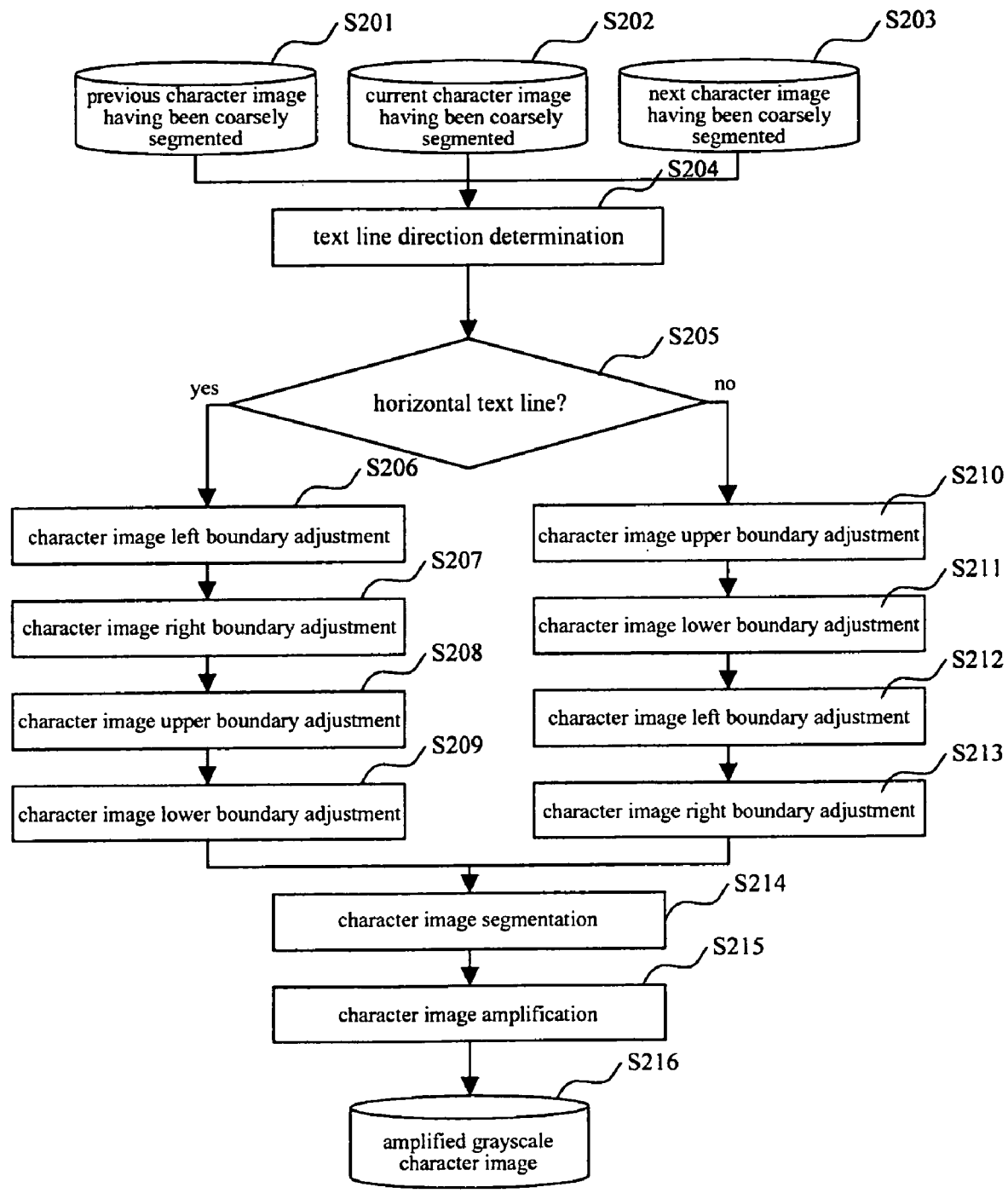
FIG. 2 is an operational flowchart showing the adjustment, segmentation and amplification unit of FIG. 1.

FIG. 2 shows the specific operational flow of the adjustment, segmentation and amplification unit 102 of FIG. 1. The input of this adjustment, segmentation and amplification unit is the low resolution grayscale text line image 101 having been coarsely segmented. Specifically, it comprises a character image S201 which is previous to the current character image, a current character image S202 and a character image S203 next to the current character image S202 which have been coarsely segmented. Since the boundary adjustment of the current character image involves the boundaries of the character images both previous and next to it, the text line direction detection unit (not shown) of the adjustment and amplification unit 102 firstly performs text line direction detection (S204). If the text line runs horizontal, in the adjustment of the left and right boundaries of the character image the adjusted boundary should not exceed too much the boundary limits of the character images left and right to it. If the text line runs longitudinal, in the adjustment of the upper and lower boundaries the adjusted boundary should not exceed too much the boundary limits of the character images above and below the current character image. The method of the text line direction detection is as follows:

use the result of the coarse segmentation of the text line (for example of the three aforementioned characters) to determine the bounding box of this text line. The result of the coarse segmentation is the bounding box of each character image (see FIG. 6-1); the box is represented by a rectangular frame, in which the width is the width of the rectangle and the height is the height of the rectangle. Here the prior art can be taken advantage of to find out the far left, far right, uppermost and lowermost coordinates of the bounding boxes of these characters (such as those mentioned above) to define a new bounding box. This bounding box is the text line bounding box.

Calculate the width and height of the text line bounding box.

If width>height, the text line is a horizontal text line. Otherwise the text line is a vertical text line.

In a preferred embodiment, after the direction of the text line in a text line image has been determined, the adjustment sequence of the text line is immediately determined. If the direction of the text line is horizontal, namely what is inputted is a horizontal text line, the character boundary is first adjusted according to left and right sequence, and then adjusted according to upper and lower sequence. If the direction of the text line is not horizontal, namely what is inputted is a vertical text line, the character boundary is first adjusted according to upper and lower sequence, and then adjusted according to left and right sequence. It should be noted that the aforementioned adjustment sequence is subject to modification.

Subsequently, the size of the character image is calculated by the character image size calculation unit (not shown) of the adjustment, segmentation and amplification unit. Define the left, right, upper and lower boundaries of the previous character image after the coarse segmentation to be $xs\_p$, $xe\_p$, $ys\_p$, $ye\_p$, the left, right, upper, lower boundaries of the current character image after the coarse segmentation to be $xs\_c$, $xe\_c$, $ys\_c$, $ye\_c$, and the left, right, upper, lower boundaries of the next character image after the coarse segmentation to be $xs\_n$, $xe\_n$, $ys\_n$, $ye\_n$. Define the width and height of the current character image after the coarse segmentation to be $width\_c$, $height\_c$. The size of the current character is defined as $size\_c$ (namely imagesize):

if $width\_c$>$height\_c$ then $size\_c=width\_c$

Else $size\_c=height\_c$

Then, the boundary of the character image is adjusted by the character image adjustment unit of the adjustment, segmentation and amplification unit 102. Define the left, right, upper, lower boundaries of the current character image after boundary adjustment again to be $xs\_c1$, $xe\_c1$, $ys\_c1$, $ye\_c1$.

The principle for the adjustment is as follows: for a horizontal text line, the left boundary and the right boundary of the character image are enlarged, but the enlargement should not exceed so much as to include the characters to the left and right of it. The limits of the upper and lower boundaries should also be widened to some extent so as to prevent the coarse segmentation from cutting a character into two parts. The extent of the widening is determined by the certain proportion of the character size $size\_c$. For a vertical text line, the upper and lower boundaries of the character image are enlarged, but the enlargement should not exceed so much as to include the characters above and below it, and the limits of the left and right boundaries should also be widened to some extent so as to prevent the coarse segmentation from cutting a character into two parts. The effect finally demanded is that, even if the coarse segmentation should erroneously segment part of a character outside the limit of the coarse segmentation, the result of the segmentation after adjustment would still entirely contain all parts of this character.

If the text line is detected as a horizontal text line, the left, right, upper and lower boundaries of the current character are adjusted by character left boundary adjustment (S206), character right boundary adjustment (S207), character upper boundary adjustment (S208), and character lower boundary adjustment (S209). In the following description the left upper corner of the image is supposed to be the origin of the coordinate, the direction of y is the downward direction along the origin of the coordinate, and the direction of x is the rightward direction along the origin of the coordinate.

The rule for character image left boundary adjustment in S206 is:

if $xe\_p <= xs\_c$ then $xs\_c1 = xe\_p$

Else $xs\_c1 = xs\_c$

The rule for character image right boundary adjustment in S207 is:

if $xe\_c < xs\_n$ then $xe\_c1 = xs\_n$

Else $xe\_c1 = xe\_c$

The rule for character image upper boundary adjustment in S208 is:

if $ys\_c - r*size\_c >= 0$ then $ys\_c1 = ys\_c - r*size\_c$

Else $ys\_c1 = 0$

The rule for character image lower boundary adjustment in S209 is:

if $ye\_c + r*size\_c <= $ height of text line then $ye\_c1 = ye\_c + r*size\_c$ Else $ye\_c1 = $ height of text line In S208 and S209, r is the parameter that controls the adjustment. An example value for r can be 0.2.

Similarly, if the text line is detected as a vertical text line, the upper, lower, left and right boundaries of the current character are adjusted by character upper boundary adjustment (S210), character lower boundary adjustment (S211), character left boundary adjustment (S212), and character right boundary adjustment (S213).

The rule for adjustment in S210 is:

if $ye\_p < ys\_c$ then $ys\_c1 = ye\_p$

Else $ys\_c1 = ys\_c$

The rule for adjustment in S211 is:

if $ye\_c < ys\_n$ then $ye\_c1 = ys\_n$

Else $ye\_c1 = ye\_c$

The rule for adjustment in S212 is:

if $xs\_c - r*size\_c > 0$ then $xs\_c1 = xs\_c - r*size\_c$

Else $xs\_c1 = 0$

The rule for adjustment in S213 is:

if $xe\_c + r*size\_c < $ width of text line then $xe\_c1 = xe\_c + r*size\_c$

Else $xe\_c1 = $ width of text line

In S212 and S213, r is the parameter that controls the adjustment. An example value for r can be 0.2.

After the adjustment, the image content of the character image defined by xs_c1, xe_c1, ys_c1 and ye_c1 is cut from the text line (S214). These four values define the left, right, upper and lower boundaries of a rectangle; the boundaries in the text line image defined in terms of this rectangle are the required section, and the copying of the content of this section is the process of cutting. Then the cut character image is amplified to N times the original size (S215). A method of image amplification algorithm can be referred in Gonzalez, *Digital Image Processing,* second edition, translated by Qiuqi YUAN, Yuzhi YUAN et al, page 50, first printed in March 2003, Publishing House of Electronic Industry. An example value for N can be 4. The output of adjustment, segmentation and amplification is an amplified grayscale character image S216 (see FIG. 6-3).

Note that the adjustment method discussed above is only exemplary, as other adjustment methods known to persons skilled in the art may also be used, as long as these methods would allow the real boundaries of a character to completely fall in the adjusted bounding box of the character.

Figure 3:
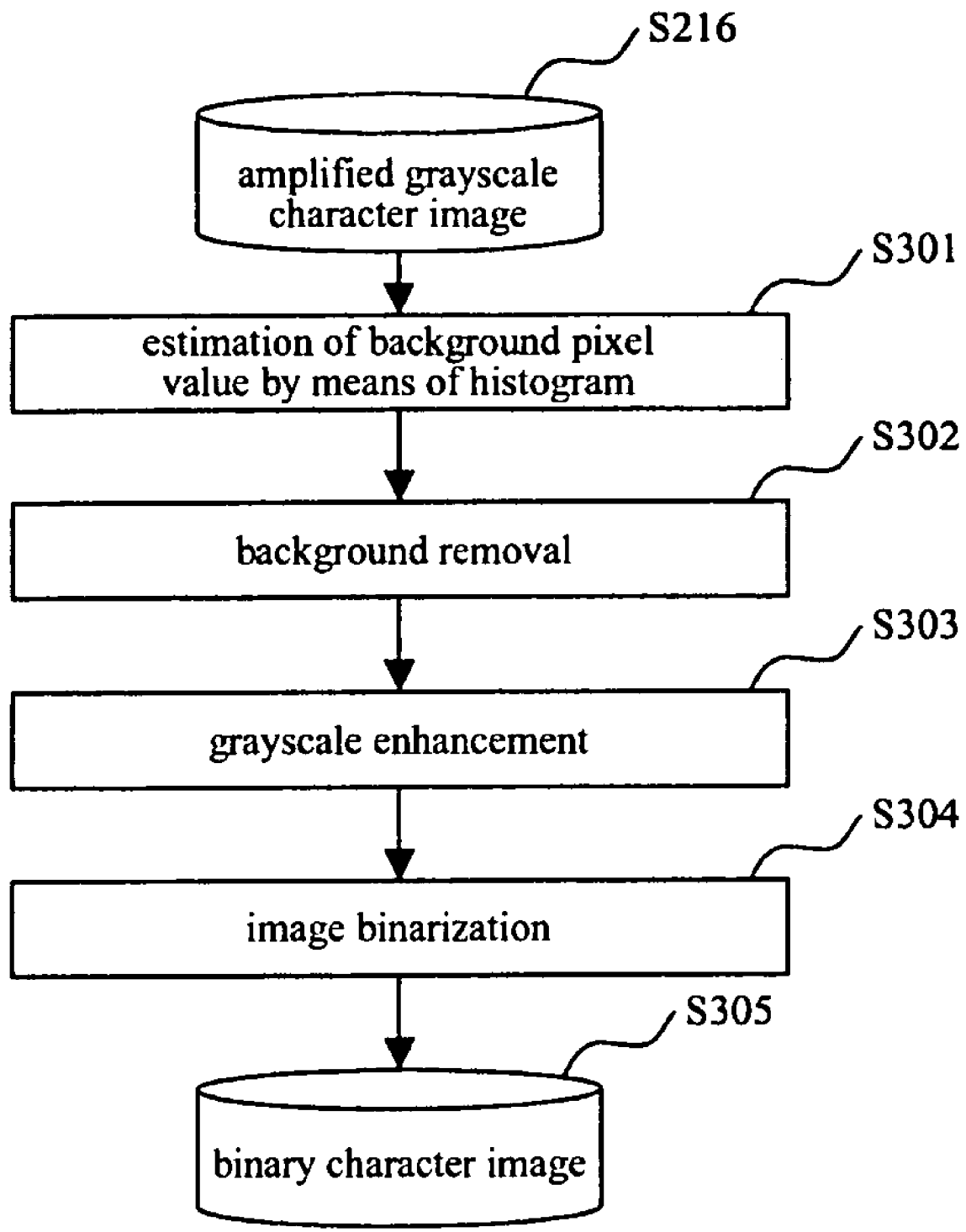
FIG. 3 is an operational flowchart showing the character image enhancement and binarization unit of FIG. 1.

FIG. 3 is an operational flowchart showing the character image enhancement and binarization unit of FIG. 1. The objective of character image enhancement is to make clearer the blurred strokes of a character under low resolution in a character image; if no character image enhancement were performed, the subsequent recognition would be in bad effect. As shown in FIG. 3, in the character image enhancement and binarization unit, the background pixel value estimation unit first estimates the background pixel value (S301). This can be obtained by using a grayscale histogram of the amplified character image S216. The calculation method of the grayscale histogram in an image may be referred in *Image Pro-* cessing and Analysis, compiled and written by Yujin ZHANG, March 1991, Tsinghua University Press. The pixel value corresponding to the maximum value in this histogram is taken as the background pixel value.

The background is then removed in S302 by the background removal unit. Supposing the ideal pixel value of the character pixel points to be 255, removal of the background would be to find out all the background pixel points, and set the pixel value of the background pixel points as 0. Specifically, assuming the background pixel value is Vbk, for instance under the circumstance where the background color is relatively bright, check all the pixel points in the inputted image: if the grayscale value of a pixel point is greater than Vbk, the grayscale value of this pixel point is set as Vbk; if the grayscale value of a pixel point is less than Vbk, the grayscale value of this point remains invariable. Under the previously assumed circumstance the pixel value of the character is less than the pixel value of the background; however, if the pixel value of the background pixel point is less than the pixel value of the character pixel point, namely under the circumstance where the background color is relatively dim, similar processing can also be employed to set the grayscale value of the pixel point whose grayscale value is less than Vbk as Vbk, and retain the pixel point whose grayscale value is greater than Vbk to achieve background removal (S302) (see also FIG. 6-3). After that, the pixel value in the grayscale image whose background has been removed is enhanced by a sigmoid function (S303). The algorithm for the enhancement is specified as follows:

1. Supposing the grayscale value of a pixel point to be g, the following transformation is firstly performed on the grayscale of each pixel point in an image:

$$f(g)=(\exp((g-\text{off})/t)-1)/(\exp((g-\text{off})/t)+1);$$

wherein off and t are parameters of the transformation; it may be for example set as off=0, t=96;

Since this function is S-shaped, it is also referred to as a sigmoid function.

2. Find out the maximum value max and the minimum value min of the function value after the transformation.
3. The following is performed with regard to the function value of each point:

$$g1=(f(g)-\min)*255/(\max-\min);$$

Then select the integer value of g1, which is the grayscale value of this point in the new image after image enhancement.

After the character has been enhanced, the enhanced grayscale image is binarized using a given threshold Th (S304). A new image is first generated, whose size is consistent with the original grayscale image. The setting of the value of the pixel point in the new image is determined by the following rule:

The grayscale value of each pixel point in the enhanced image is determined: if the grayscale value is greater than Th, the grayscale value of the corresponding point in the new image is set as 255; otherwise it is set as 0. Since there can be only two choices in the setting of the value of the pixel point in the new image, namely 0 or 255, this process is therefore called binarization. The result of binarization is the obtaining of a binary character image S305 (see also FIG. 6-4).

Usually the binary character image will contain some noises near the character boundary. These noises can be background pixels, or character strokes of the previous or next characters due to inexact coarse segmentation. So the method according to this invention performs a noise removal process to remove these noises. In other words, although after segmentation and adjustment the character itself is entirely included within the adjusted boundary, some strokes of the adjacent characters might also be included within this boundary. These strokes are noise information, and there is hence a need to remove the noises.

Figure 4:
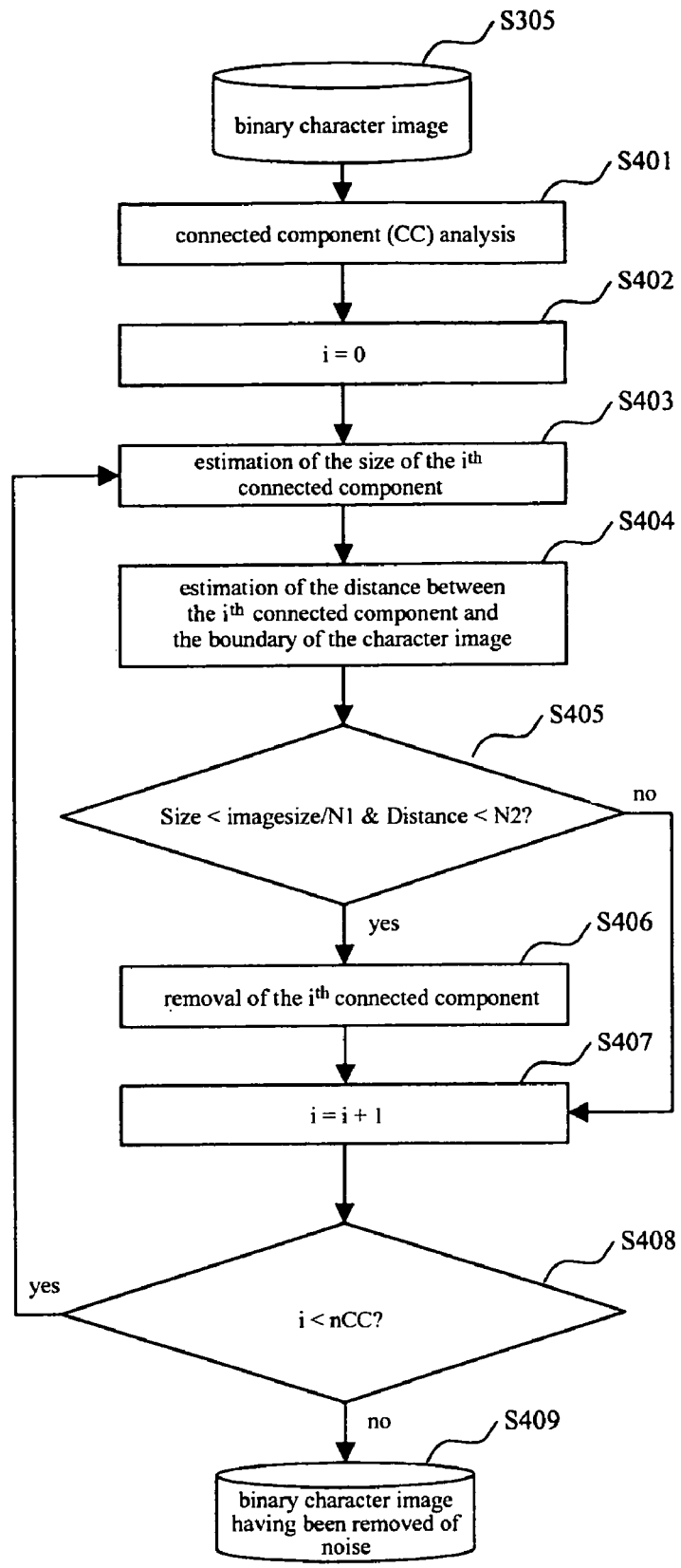
FIG. 4 is a detailed operational flowchart showing the noise removal unit of FIG. 1.

FIG. 4 is a detailed flowchart showing the noise removing process of the noise removal unit 104 of FIG. 1. As shown in FIG. 4, first the connected component analysis unit of the noise removal unit analyzes the connected components (CC) of the inputted binary character image (S305) to find out the pixel points contained in each connected component and obtain the total number of the connected components (S401). The connected component is a collection of the pixels connecting each other in a binary image, for example, there are two connected components in "二 (standing for the Arabic numeral '2')". The connected component analysis algorithm in an image can be referred in Gonzalez, *Digital Image Processing*, second edition, pages 435-436, translated by Qiuqi YUAN, Yuzhi YUAN et al, first printed in March 2003, Publishing House of Electronic Industry.

Then a noise connected component determination unit determines whether a connected component is a noise connected component. In carrying out the determination of whether it is a noise connected component, firstly the size of the connected component and its distance from the character boundary have to be calculated. Specifically, it is set as i=0 (S402), wherein i represents the reference number of the connected component in the image, and i=0 represents starting from the first connected component. Subsequently, the outer bounding box of each connected component is obtained from the first connected component. The upper, lower, left and right boundaries of all the pixel points of the connected component make up the outer bounding box of this connected component. The size Size of the connected component is then estimated, that is, the larger value between the value of width and the value of height of the outer bounding box of the connected component (S403). The distance between the outer bounding box of the $i^{th}$ connected component ($i^{th}$ CC) and the boundary of the character image is obtained and defined as Distance (S404). In addition, define the size of the character image as imagesize, namely the aforementioned size of the character image, which is the larger one between the value of width and the value of height of the character image. Determination is then performed to see whether this connected component is a noise connected component (S405), and, in the case it is determined as a noise connected component, this connected component is removed (S406). That is to say, if a connected component satisfies the two conditions specified below, it will be regarded as a noise connected component and removed from the binary character image.

The two conditions are as follows:
1. Size<imagesize/N1
2. Distance<N2 wherein N1 is a scale number, for instance N1=3, and N2 is a threshold of the distance. That is to say, if the size of a connected component is very small (for example, less than one third of the size of the character image), the distance between it and the character boundary is less than a predetermined threshold, and this component is then a noise connected component.

The noise connected component is removed by the noise connected component removal unit, whose operation runs as follows:

1. establish a new image whose size is the same with that of the original binary image, and set the values of all the pixel points in the new image as 0; and 2. with regard to each of the pixel points in the non-noise connected component (including those not yet determined) in the original binary image, the grayscale values of the corresponding pixel points in the new image are set as 255. The new image is the character image having been removed of the noise connected component(s).

All the connected components in a binary character image are performed with the aforementioned steps of size calculation, distance estimation, determination of noise connected component and removal upon determination to be a noise connected component etc., and finally a binarized character image free of noise is outputted (S409) (see also 6-5).

Specifically, the steps of determination and removal of the noise connected component are as follows: the size of the connected component is estimated in step S403, and the distance between this connected component and the boundary is estimated in step S404, determination is then made in step S405 to see whether the connected component satisfies the aforementioned two conditions: if the two conditions are not met, the procedure goes on to step S407, where the next connected component is designated by adding 1 to the $i^{th}$ value, and then goes on to step S408; if the two conditions are met, this connected component is determined as a noise connected component to be removed in step S406, the procedure goes again to step S407 to designate the next connected component, and then goes on to step S408. It is determined in step S408 whether all the connected components have been analyzed (nCC in FIG. 4 stands for the total number of the components): if no, the procedure goes to step S403, starting from which the analysis of the designated connected components; if yes, a binary character image having been removed of the noise is outputted (S409).

Figure 5:
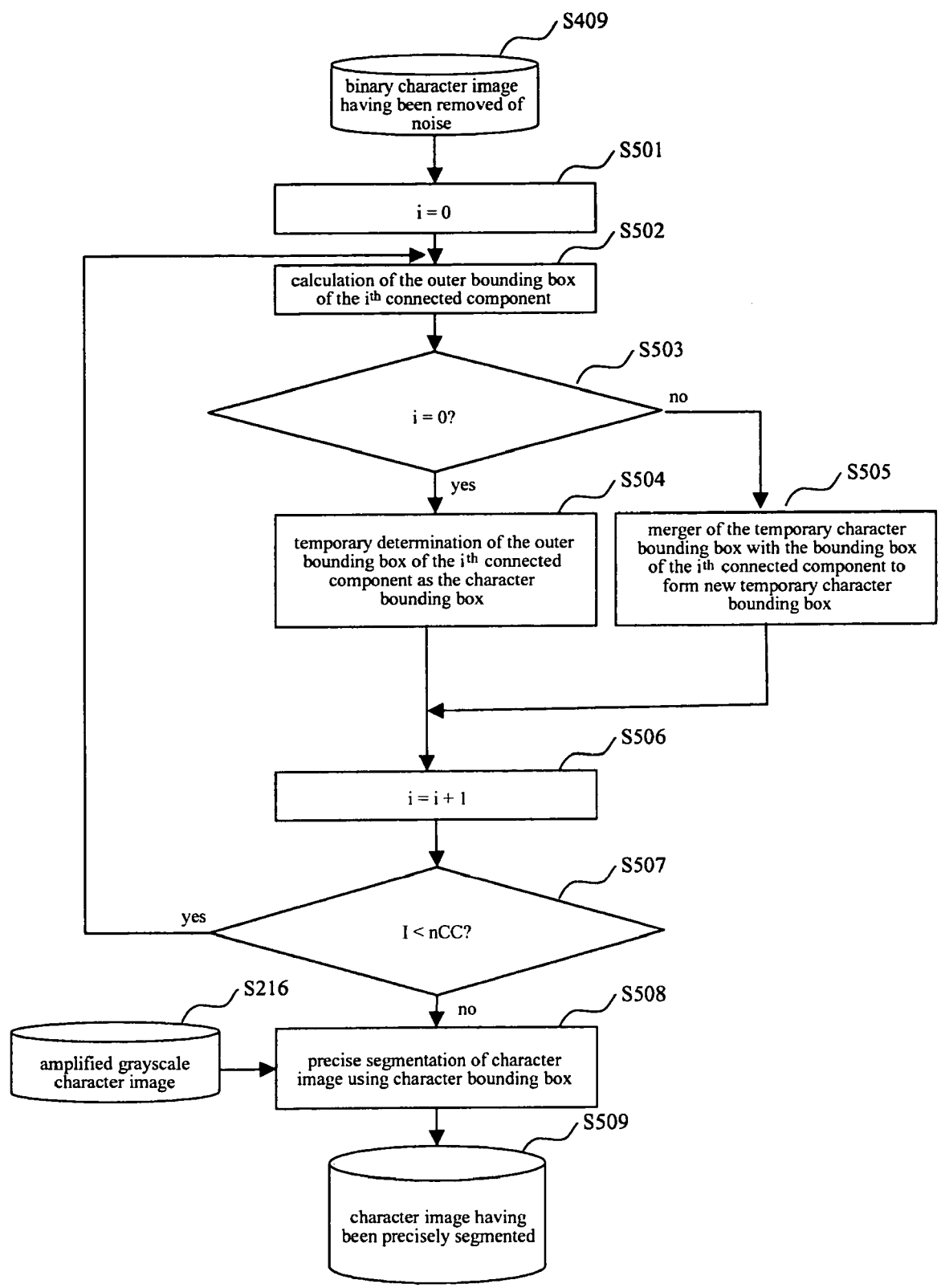
FIG. 5 is a detailed operational flowchart showing the final character image segmentation unit.

FIG. 5 shows a detailed operational flowchart of the final character image segmentation unit 105. A binary character image having been removed of noise is first inputted (S409), and it is set as i=0 (S501), wherein i represents the reference number of the connected component in the image, and i=0 represents starting from the first connected component. Then the outer bounding box of the connected component is calculated (S502), that is, to find out the uppermost, far left, far right and lowermost boundaries of all the pixel points of this connected component. It is then determined whether i equals to 0 (S503): if it equals to 0 (yes in S503), the outer bounding box of this connected component is set as a temporary character bounding box (S504); if not (no in S503), the bounding box of this connected component is merged with the temporary character bounding box in step S505. Put in other words, the most initial temporary character bounding box is the outer bounding box of the first connected component, and, starting from the second connected component, the two bounding boxes are merged, one of which is the outer bounding box of all current components (a collection of the first to the one previous to the current connected component, namely the temporary character bounding box), and the other of which is the outer bounding box of the current connected component, so that a new temporary character bounding box is obtained. The merging step is to find out the uppermost, lowermost, far left and far right boundaries of the two bounding boxes, i.e., the outer bounding box after the merger. Subsequently in step S506, the next connected component is designated by adding 1 to the $i^{th}$ value, and it is determined in step S507 whether all of the connected components have been processed: if no, the procedure returns to step S502 to repeat the aforementioned steps until all of the connected components have been processed. The temporary character bounding box obtained at this time is the required character bounding box. And then, in the amplified grayscale character image S216, the grayscale content framed in this character bounding box is extracted (S508), that is to say, the framed image as defined by the character bounding box is copied out of the amplified grayscale image. This is the precisely segmented character image, which is the final output of this invention (see also FIG. 6-6).

Figures 1, 6:
Figures 2, 6:
Figures 3, 6:
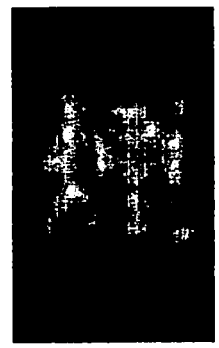
Figures 4, 6:
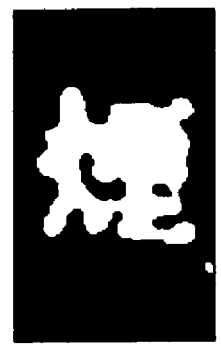
Figures 5, 6:
Figure 6:

FIGS. 6-1-6-6 show the output results of each of the aforementioned units: FIG. 6-1 shows the inputted coarse segmentation; FIG. 6-2 is the result after adjustment, segmentation and amplification; FIG. 6-3 is the result after removal of the background pixel; FIG. 6-4 is the result after binarization; FIG. 6-5 is the result after removal of the noise; and FIG. 6-6 is the final segmented character image.

This invention makes it possible to precisely obtain the boundary of the character in a low resolution image, so as to effectively segment the character, and provide an effective guarantee for subsequent steps in character recognition, such as character feature extraction.

It should be comprehended to a person skilled in the art that various revisions and modifications can be made to this invention without departing from the spirit and scope of this invention. This invention therefore covers all the revisions and modifications that fall into the scope claimed in the claims as attached and their equivalences as defined therein.

What is claimed is:

1. A precise grayscale character segmentation apparatus, comprising:

an adjustment and segmentation unit, for adjusting and segmenting single-character images in a low resolution grayscale text line image undergone coarse segmentation which is inputted therein, so as to generate adjusted and segmented character images;

a character image binarization unit, for generating a binary character image from the adjusted and segmented character image inputted;

a noise removal unit, for removing noise information in the binary character image generated by the character image binarization unit; and a final character image segmentation unit, for generating a precisely segmented character image from the binary character image from which noise information has been removed.

2. The precise grayscale character segmentation apparatus according to claim 1, further including:

an amplification unit, interposed between the adjustment and segmentation unit and the character image binarization unit, for amplifying the adjusted and segmented character image generated by the adjustment and segmentation unit before the adjusted and segmented character image is inputted into the character image binarization unit.

3. The precise grayscale character segmentation apparatus according to claim 1, further including:

a character image enhancement unit, interposed between the adjustment and segmentation unit and the character image binarization unit, for enhancing the adjusted and segmented character image generated by the adjustment and segmentation unit before the adjusted and segmented character image is inputted into the character image binarization unit, to make clearer the strokes of the character within the character image.

4. The precise grayscale character segmentation apparatus according to claim 2, further including:

a character image enhancement unit, interposed between the amplification unit and the character image binarization unit, for enhancing the adjusted and segmented character image amplified by the amplification unit before the adjusted and segmented character image amplified is inputted into the character image binarization unit, to make clearer the strokes of the character within the character image.

5. The precise grayscale character segmentation apparatus according to any of claims 1 to 4, wherein the adjustment and segmentation unit includes:
   a text line direction detection unit, for detecting the direction of the text line which is in the text line image;
   a character image size calculation unit, for calculating the size of the character image; and
   a character image adjustment unit, for adjusting the character image in response to the detecting result of the text line direction detection unit and the calculating result of the character image size calculation unit, so that all strokes of the character are contained in the adjusted and segmented character image.

6. The precise grayscale character segmentation apparatus according to claim 3 or 4, wherein the character image enhancement unit includes:
   a background pixel value estimation unit, for estimating the background pixel value of an inputted character image; a background removal unit, for removing the background based on the
   background pixel value estimated by the background pixel value estimation unit; and a pixel
   value enhancement unit, for enhancing pixel value of the character image from which the background has been removed.

7. The precise grayscale character segmentation apparatus according to claim 6, wherein the background pixel value estimation unit estimates the background pixel value using a histogram based method.

8. The precise grayscale character segmentation apparatus according to claim 6, wherein the pixel value enhancement unit enhances the pixel value using an S shape function.

9. The precise grayscale character segmentation apparatus according to any of claims 1 to 4, wherein the noise removal unit includes:
   a connected component analysis unit, for analyzing connected components of the binary character image to find out all pixel points of each connected component and calculate the total number of the connected components within the binary character image;
   a noise connected component determination unit, for determining whether a connected component is a noise connected component; and
   a noise connected component removal unit, for removing the connected component within the binary character image which is determined as a noise connected component by the noise connected component determination unit.

10. The precise grayscale character segmentation apparatus according to claim 9, wherein
    the noise connected component determination unit determines whether a connected component is a noise connected component by the following two conditions:
       size of the connected component<size of the binary character image/scale number, and
       distance between the boundary of the connected component and the boundary of the binary character image<threshold; and
    a connected component is determined as a noise connected component if it satisfies both of the conditions.

11. The precise grayscale character segmentation apparatus according to claim 10, wherein the scale number is 3 or 4 times the size of the binary character image.

12. A method for precisely segmenting single grayscale characters in a text line image undergone coarse segmentation, comprising:
    a computer performing:
       adjustment and segmentation adjusting and segmenting single-character images in an inputted low resolution grayscale text line image undergone coarse segmentation, so as to generate adjusted and segmented character images;
    character image binarization binarizing the character image processed by the adjustment and segmentation;
    noise removal removing noise information in the binary character image generated at the character image binarization; and
    final character image segmentation generating a precisely segmented character image from the binary character image from which noise information has been removed.

13. The method according to claim 12, further including:
    amplification amplifying the adjusted and segmented character image generated at the adjustment and segmentation before the adjusted and segmented character image is processed by the character image binarization.

14. The method according to claim 13, further including:
    character image enhancement enhancing the adjusted and segmented character image amplified at the amplification, before the character image binarization, to make clearer the strokes of the character within the character image.

15. The method according to claim 12, wherein the adjustment and segmentation includes:
    text line direction detection detecting the direction of the text line
    character image size calculation calculating the size of the character image; and
    character image adjustment adjusting the character image in response to the detecting result of the text line direction detection and the calculating result of the character image size calculation unit, so that all strokes of the character are contained within the character image.

16. The method according to claim 14, wherein the character image enhancement includes:
    background pixel value estimation estimating the background pixel value of a character image;
    background removal removing the background based on the background pixel value estimated by the background pixel value estimation; and
    pixel value enhancement enhancing pixel value of the character image from which the background has been removed.

17. The method according to claim 16, wherein the background pixel value is estimated by using a histogram based method at the background pixel value estimation.

18. The method according to claim 16, wherein the pixel value of the character image from which the background has been removed is enhanced using an S shape function at the pixel value enhancement.

19. The method according to any of claims 12 to 18, wherein the noise removal includes:
    connected component analysis analyzing connected components of the binary character image to find out all pixel points of each connected component and calculate the total number of the connected components within the binary character image;
    noise connected component determination determining whether a connected component is a noise connected component; and noise connected component removal removing the connected component within the binary character image which is determined as a noise connected component at the noise connected component determination.

20. The method according to claim 19, wherein a connected component is determined whether to be a noise connected component or not at the noise connected component determination by the following two conditions:

size of the connected component<size of the binary character image/scale number, and distance between the boundary of the connected component and the boundary of the binary character image<threshold; and a connected component is determined as a noise connected component if it satisfies both of the conditions.

\* \* \* \* \*

UNITED STATES PATENT AND TRADEMARK OFFICE
CERTIFICATE OF CORRECTION

PATENT NO. : 7,715,628 B2  Page 1 of 1
APPLICATION NO. : 11/356449
DATED : May 11, 2010
INVENTOR(S) : Sun Jun et al.

It is certified that error appears in the above-identified patent and that said Letters Patent is hereby corrected as shown below:

Column 13, Line 17-28 change the paragraph indentation in claim 6 from

"6.The precise grayscale character segmentation apparatus according to claim 3 or 4, wherein the character image enhancement unit includes:
a background pixel value estimation unit, for estimating the background pixel value of an inputted character image; a background removal unit, for removing the background based on the
background pixel value estimated by the background pixel value estimation unit; and a pixel
value enhancement unit, for enhancing pixel value of the character image from which the background has been removed."

to

-- 6. The precise grayscale character segmentation apparatus according to claim 3 or 4, wherein the character image enhancement unit includes:
a background pixel value estimation unit, for estimating the background pixel value of an inputted character image;
a background removal unit, for removing the background based on the background pixel value estimated by the background pixel value estimation unit; and
a pixel value enhancement unit, for enhancing pixel value of the character image from which the background has been removed. --.

Column 14, Line 32, change "text line" to -- text line; --.

Signed and Sealed this

Seventeenth Day of August, 2010

David J. Kappos
*Director of the United States Patent and Trademark Office*